(12) United States Patent
Vemuri et al.

(10) Patent No.: US 11,570,594 B2
(45) Date of Patent: Jan. 31, 2023

(54) METHOD OF FACILITATING ON-DEMAND WIRELESS CONNECTIVITY USING DEVICE-TO-DEVICE RESOURCES AND DATA POOLING WITH A VEHICLE PLATOON

(71) Applicant: GM Global Technology Operations LLC, Detroit, MI (US)

(72) Inventors: Venkata Naga Siva Vikas Vemuri, Novi, MI (US); Andrew J. MacDonald, Grosse Pointe Park, MI (US); Scott Thomas Droste, West Bloomfield, MI (US); Ashhad Mohammed, West Bloomfield, MI (US); Charles A. Everhart, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 13 days.

(21) Appl. No.: 17/332,402

(22) Filed: May 27, 2021

(65) Prior Publication Data
US 2022/0386094 A1 Dec. 1, 2022

(51) Int. Cl.
| | |
|---|---|
| *H04W 4/46* | (2018.01) |
| *H04W 4/12* | (2009.01) |
| *G08G 1/00* | (2006.01) |
| *H04W 8/24* | (2009.01) |
| *H04W 4/70* | (2018.01) |

(52) U.S. Cl.
CPC ............... *H04W 4/46* (2018.02); *G08G 1/22* (2013.01); *H04W 4/12* (2013.01); *H04W 4/70* (2018.02); *H04W 8/24* (2013.01)

(58) Field of Classification Search
CPC .......... H04W 4/12; H04W 4/46; H04W 4/70; H04W 8/24
See application file for complete search history.

(56) References Cited

U.S. PATENT DOCUMENTS

| | | | |
|---|---|---|---|
| 2019/0051158 A1* | 2/2019 | Felip Leon | G08G 1/096783 |
| 2019/0079659 A1* | 3/2019 | Adenwala | H04W 4/44 |
| 2020/0118445 A1* | 4/2020 | Kim | H04W 4/46 |
| 2020/0127820 A1* | 4/2020 | Misoczki | H04W 12/02 |
| 2020/0163005 A1* | 5/2020 | Rao | H04W 8/24 |

(Continued)

*Primary Examiner* — Congvan Tran
(74) *Attorney, Agent, or Firm* — Vivacqua Crane, PLLC (57) ABSTRACT

A method of facilitating on-demand wireless connectivity and data pooling with a vehicle platoon. The method includes detecting a potential host vehicle within a predetermined radius from the requesting vehicle; sending a request message to the potential host vehicle requesting to join the potential host vehicle in a vehicle platoon and to execute an application (APP) by utilizing the vehicle platoon's mobile edge computing (MEC) capabilities; sending a reply message by the host vehicle to join the potential host vehicle in the vehicle platoon; joining the potential host vehicle, by the requesting vehicle, in the vehicle platoon; and wirelessly transmitting to the potential host vehicle in the utilization of the host vehicle's MEC capabilities by pooling the APP data. The vehicle platoon is configured with an advance driver assisted system (ADAS) wireless communications, and MEC capabilities. A MEC module is disposed in at least one of the platoon vehicles.

16 Claims, 7 Drawing Sheets

(56) References Cited

U.S. PATENT DOCUMENTS

| | | | |
|---|---|---|---|
| 2021/0112441 A1* | 4/2021 | Sabella | H04W 40/18 |
| 2021/0291732 A1* | 9/2021 | Woo | H04W 4/46 |
| 2022/0066469 A1* | 3/2022 | Ghannam | G06Q 10/06312 |
| 2022/0105954 A1* | 4/2022 | Li | H04W 4/44 |
| 2022/0108618 A1* | 4/2022 | Kumar | H04W 4/46 |

* cited by examiner

METHOD OF FACILITATING ON-DEMAND WIRELESS CONNECTIVITY USING DEVICE-TO-DEVICE RESOURCES AND DATA POOLING WITH A VEHICLE PLATOON

INTRODUCTION

The present disclosure relates to methods of facilitating wireless connectivity with vehicle platoons, more specifically to a method of facilitating on-demand wireless connectivity using device-to-device resources and data pooling with a vehicle platoon.

Vehicles equipped with Advance Driver Assisted Systems (ADAS) can be enabled to wirelessly connect and exchange information with other ADAS equipped vehicles to allow for the coordinated movements between such vehicles. One example of such coordinated movements is a platooning of ADAS equipped vehicles, also referred to as a vehicle platoon. Vehicles platooning improves the aerodynamic effectiveness and performance of the moving vehicles, thereby increases the capacity of roads and provides a more steady-state traffic flow.

ADAS equipped vehicles typically utilize vehicle-to-vehicle (V2V) communications using Dedicated Short-Range Communications (DSC) for wirelessly receiving and transmitting data with other ADAS equipped vehicles participating in the platoon. The lead vehicle utilizes V2V communications to monitor and send instructions to the follow vehicles in the platoon. The follow vehicles respond to the lead vehicle's movement and/or instructions by precisely matching steering, braking, and acceleration of the lead vehicle in the same direction of travel and communicates back to the lead vehicle using V2V communications.

While the vehicles are platooning, the ADAS are in control of the vehicles, thereby leaving the vehicles operators and occupants free to engage in work or leisure activities. Examples of work activities include, but not limited to, conference calling using voice and/or video streaming, retrieving and sending emails, researching information on the web, and the likes. Examples of leisure activities include, but not limited to, video calls, online video gaming, streaming movie, and the likes.

Data usage required for these activities are typically transmitted over a cellular network via a remote base station using personal electronic devices, such as smart phones and cellular connected computers or tablets, or via the telematics systems of the vehicles. Activities such as graphic intensive online gaming and video streaming are data intensive and processing power intensive, resulting in possible over usage of cellular data, sluggish performance, and decrease in battery life of the devices.

Thus, while current methods of wireless connectivity such as V2V and cellular communications used in platooning vehicles are adequate for most needs, there is a continual need for more efficient methods of facilitating wireless connectivity and data management between platooning vehicles.

SUMMARY

According to several aspects, a method of facilitating on-demand wireless connectivity and data pooling with a vehicle platoon is disclosed. The method includes a requesting vehicle detecting a vehicle platoon within a predetermined radius, wherein the vehicle platoon comprises a plurality of participating vehicles configured for wireless communications and for data pooling between the plurality of participating vehicles; sending a request message to the vehicle platoon, wherein the request message includes a request to join the vehicle platoon; receiving a reply message from the vehicle platoon, wherein the reply message includes a permission to join the vehicle platoon; joining the vehicle platoon; and using device-to-device (D2D) communications to communicate with the participating vehicles in the vehicle platoon.

In an additional aspect of the present disclosure, the request message includes a list of software applications, and the reply message includes confirmation that at least one of the participating vehicles is configured to execute at least one software application (APP) on the list of software applications. The method further includes using the D2D communications to data pool APP data with the vehicle platoon for execution the at least one APP.

In another aspect of the present disclosure, the vehicle platoon includes a mobile edge computing (MEC) capability. The MEC capability includes a MEC module disposed on-board one of the plurality of participating vehicles. The method includes executing the at least one APP using the MEC capability.

In another aspect of the present disclosure, the reply message from the vehicle platoon includes a confirmation that the vehicle platoon has at least one APP on the list of software applications available for downloading using the D2D communications.

In another aspect of the present disclosure, the reply message from the vehicle platoon includes a verification that the vehicle platoon is capable of providing a predetermined level of quality-of-service and quality-of-experience for executing the at least one APP.

In another aspect of the present disclosure, the method further includes using cellular-to-vehicle (C-V2X) communications to communicate with the vehicle platoon for executing the at least one APP before joining the vehicle platoon.

In another aspect of the present disclosure, the method further includes switching to one of vehicle-to-vehicle (V2V) communications and D2D communications to communicate with the vehicle platoon for executing the at least one APP after joining the vehicle platoon.

In another aspect of the present disclosure, the method further includes sending an intent to leave message to the vehicle platoon, wherein the intent to leave message includes an intent to remain in communication with the vehicle platoon for continued execution of the at least one APP; leaving the vehicle platoon; and switching from one of V2V communications and D2D communications to C-V2X communications to remain in communication with the vehicle platoon for continued execution of the at least one APP after leaving platoon.

In another aspect of the present disclosure, the at least one APP is one of an advance driver assisted system application and a gaming application According to several aspects, a method of facilitating on-demand wireless connectivity between vehicles is disclosed. The method includes detecting, by a requesting vehicle, a potential host vehicle within a predetermined radius from the requesting vehicle, wherein the potential host vehicle is configured with an advance driver assisted system (ADAS), wireless communications, and mobile edge computing (MEC) capabilities; sending a request message, by the requesting vehicle, to the potential host vehicle requesting to join the potential host vehicle in a vehicle platoon and to execute an application (APP) by utilizing the host vehicle's MEC capabilities; sending a reply message, by potential host vehicle, to join the potential host vehicle in the vehicle platoon; joining the potential host vehicle, by the requesting vehicle, in the vehicle platoon; and wirelessly transmitting APP data, by the request vehicle, to the potential host vehicle in the utilization of the host vehicle's MEC capabilities.

In an additional aspect of the present disclosure, the wirelessly transmitting information to the potential host vehicle includes using Device-to-Device (D2D) communications.

In another aspect of the present disclosure, the vehicle platoon includes a plurality of participating vehicles using D2D communications to transmit a data-pool defining a data-pipe amongst the plurality of participating vehicles.

In another aspect of the present disclosure, the APP includes an APP to operate a component of the ADAS; and further include the requesting and evaluating the platooning capabilities of the requesting vehicle, by the potential host vehicle, before sending the reply message to join the potential host vehicle in the vehicle platoon.

According to several aspects, a method of facilitating on-demand wireless connectivity with a vehicle platoon is provided. The method includes detecting, by a requesting vehicle, a vehicle platoon within a predetermined radius, wherein the vehicle platoon comprises a plurality of participating vehicles configured to wirelessly exchange information with each other; sending, by the requesting vehicle, a request message to the vehicle platoon, wherein the request message includes a request to join the vehicle platoon; receiving, by the requesting vehicle, a reply message from the vehicle platoon, wherein the reply message includes a permission to join the platoon; joining, by the requesting vehicle, the vehicle platoon; using, by the requesting vehicle, one of device-to-device (D2D) communications and vehicle-to-vehicle (V2V) communications to exchange APP data with the vehicle platoon for executing the at least one APP after joining the vehicle platoon; and executing, by the vehicle platoon, the at least one APP using mobile edge computing.

In an additional aspect of the present disclosure, the method further includes using, by the requesting vehicle, the cellular-to-vehicle (C-V2X) communication to exchange information with the vehicle platoon for executing the at least one APP before joining the vehicle platoon.

In another aspect of the present disclosure, the method further includes sending, by the requesting vehicle, an intent to leave message to the vehicle platoon, wherein the intent to leave message includes an intent to remain in communication with the vehicle platoon for continued execution of the at least one APP; and leaving, by the requesting vehicle, the vehicle platoon.

In another aspect of the present disclosure, the method further includes switching, by the requesting vehicle, from one of V2V communication and D2D communication to C-V2X communication to remain in communication with the vehicle platoon for continued execution of the at least one APP after the leaving the vehicle platoon.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
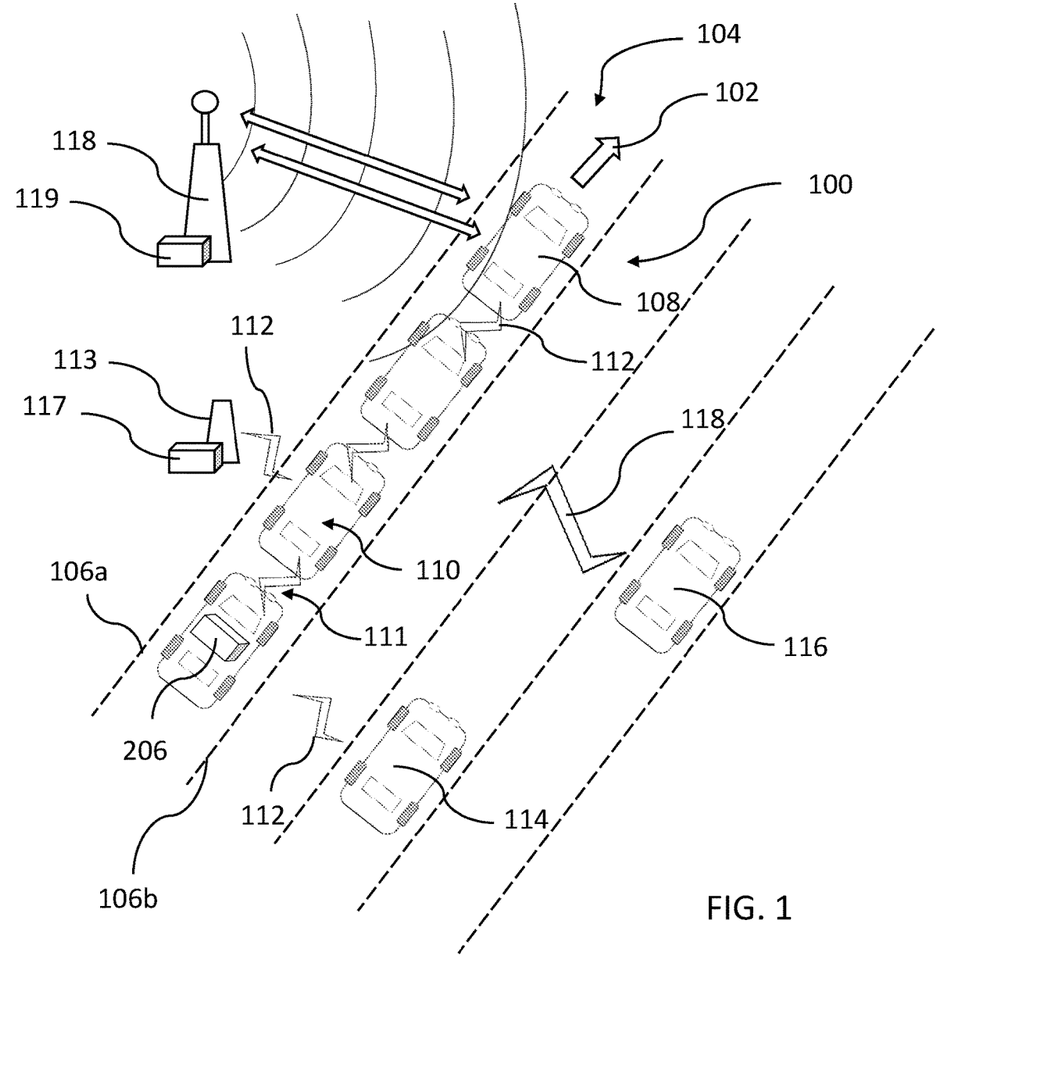
FIG. 1 is an illustration of a platoon of vehicles utilizing wireless communications and data pooling capabilities, according to an exemplary embodiment.

FIG. 1 shows an exemplary platoon 100 of vehicles, also referred to as a vehicle platoon 100, traveling in a single file in a forward direction 102 within a travel lane 104 defined between two lane markers 106a, 106b. The platoon 100 includes a lead vehicle 108 and a plurality of follow vehicles 110, also referred to as participating vehicles 108, 110. Each of the participating vehicles 108, 110 are equipped with an advance driver assisted system (ADAS) that is configured to operate in a range of modes from a partial autonomous mode, requiring driver/operator input, to a full autonomous mode, requiring minimal to no driver/operator input. The term "operator" describe a person responsible for directing operation of the vehicle, whether actively involved in controlling one or more vehicle functions or directing autonomous vehicle operation. An ADAS configured for partial or full autonomous operating mode is also referred to as an autonomous driving system (ADS). For the purpose of this disclosure ADAS and ADS are used interchangeably.

The lead vehicle 108 utilizes vehicle-to-vehicle (V2V) communications 112 to send instructions/command to the follow vehicles 110. The follow vehicles 110 may communicate with each other and with the lead vehicle by using V2V communications. V2V communications 112 typically utilizes Dedicated Short Range Communications (DSRC), which is a type of Wi-Fi that sends data containing messages and safety related information over short distances (approximately less than a 1,000 feet radius) for the coordinated and safe operations of the platoon 100. Information shared using V2V communications within the platoon 100 of vehicles may include the platoon headings, upcoming road conditions and traffic, weather, and other information necessary for the safe operations of the platoon 100 of vehicles. One or more of the lead and follow vehicles 108, 110 may also communicate with a road side unit 113 using V2V communications 112. The road side unit 113 may collect information such as the location and heading of the platoon 100 and relays the information to other remote vehicles 114, 116 configured for V2V communications and to remote servers or third party service providers (not shown).

A non-participating first remote vehicle 114 proximal to the platoon 100 within V2V communications range may utilize V2V communications 112 to communicate with the platooning vehicles 108, 110, electronic devices within the platooning vehicles 108, 110, and the road side unit 113. A non-participating second remote vehicle 116 outside the V2V communications range may utilize device-to-device communication (D2D) communications 118 to communicate with the platooning vehicles 108, 110 and electronic devices within the platooning vehicles 108, 110. The first remote vehicle 114 and the second remote vehicle 116 are referred to as requesting vehicles if a request is made to join the platoon 100 or data pool with the platoon 100.

D2D communications 116 is defined as communications in which two or more personal electronic devices, also referred to as user equipment (UE) devices, transmit and receive radio signals directly. Radio signals include electromagnetic waves of frequency between 30 hertz (Hz) and 300 gigahertz (GHz). D2D is a component of third (3G), fourth (4G), and (5G) generations of cellular networks and allows UE devices to transmit data signals to each other over a direct link/connection using radio resources instead of transmitting through a base station 118 or other network infrastructure. Examples of UE devices include, but are not limited to, vehicle telematics and infotainment systems, smart phones, tablets, laptops, electronic gaming devices, and any electronic equipment that is capable of connecting to a cellular network. D2D communications promote high data rates, high coverage, lower latency with the exchange of data between participating vehicles 108, 110 in the platoon 100 and non-participating remote vehicles 114, 116 outside of the platoon 100.

Data flow using V2V and/or D2D communications between participating vehicles 114, 116 in the platoon 100 defines a data-pipe 111. The data may be pooled and processed by mobile edge computing (MEC) before being transmitted to its end destination, such as a server in the cloud via the base station 118. MEC is a network architecture that allows cloud computing capabilities and computing services to be performed at the edge of the cellular network. MEC provides mechanisms that allow data intensive software applications (APPS) to be executed and to perform related processing tasks closer to cellular network subscribers.

By using MEC, cellular network congestion may be reduced and the APPS and UE devices may have better performance. MEC may be processed by a MEC module 117 located proximal to the road side unit 113 or a MEC module 119 located proximal to the base station 118. While only one road side unit 113 and one base station 118 are shown, it should be appreciated that multiple road side units 113 and base stations 118, together with associated MEC modules 117, 119 are disposed and accessible along the path of the platoon 100.

One or more of the participating vehicles 108, 110 in the platoon 100 may have an on-board mobile edge module 206, configured for mobile edge computing (MEC). By providing a mobile edge module 206 on at least one of the participating vehicles 108, 110, the platoon 100 may retain MEC capabilities while travel through areas where the road side unit 113 and base stations 118 are not equipped with MEC modules. The mobile edge module 206 may receive data from the vehicle ADAS system and the UE devices by way of V2V and/or D2D communications. The mobile edge module 206 then processes the data and then transmits the processed data back to the ADAS system and UE devices, as well as transmit the processed data to a remote server or end user by way of cellular-to-vehicle communications (C-V2X).

Streaming video and online gaming typically requires large data sizes, which quickly consumes cellular data and increase demand on processing power on the personal electronic devices that may cause processing delays, as well as shorten the battery life of personal electronic devices. V2V and D2D communications may be used in data offloading to the mobile edge modules 117, 119, 206 in response to the increase in data traffic in the cellular network due to the increase in data usage. High data usage applications (APPS) may be offloaded from the cellular network to the data-pipe 111 of the platoon using V2V or D2D communications for processing in the mobile edge modules 117, 119, 206, thereby moderating the resource consumption and processing load onto the cellular network.

Figure 2:
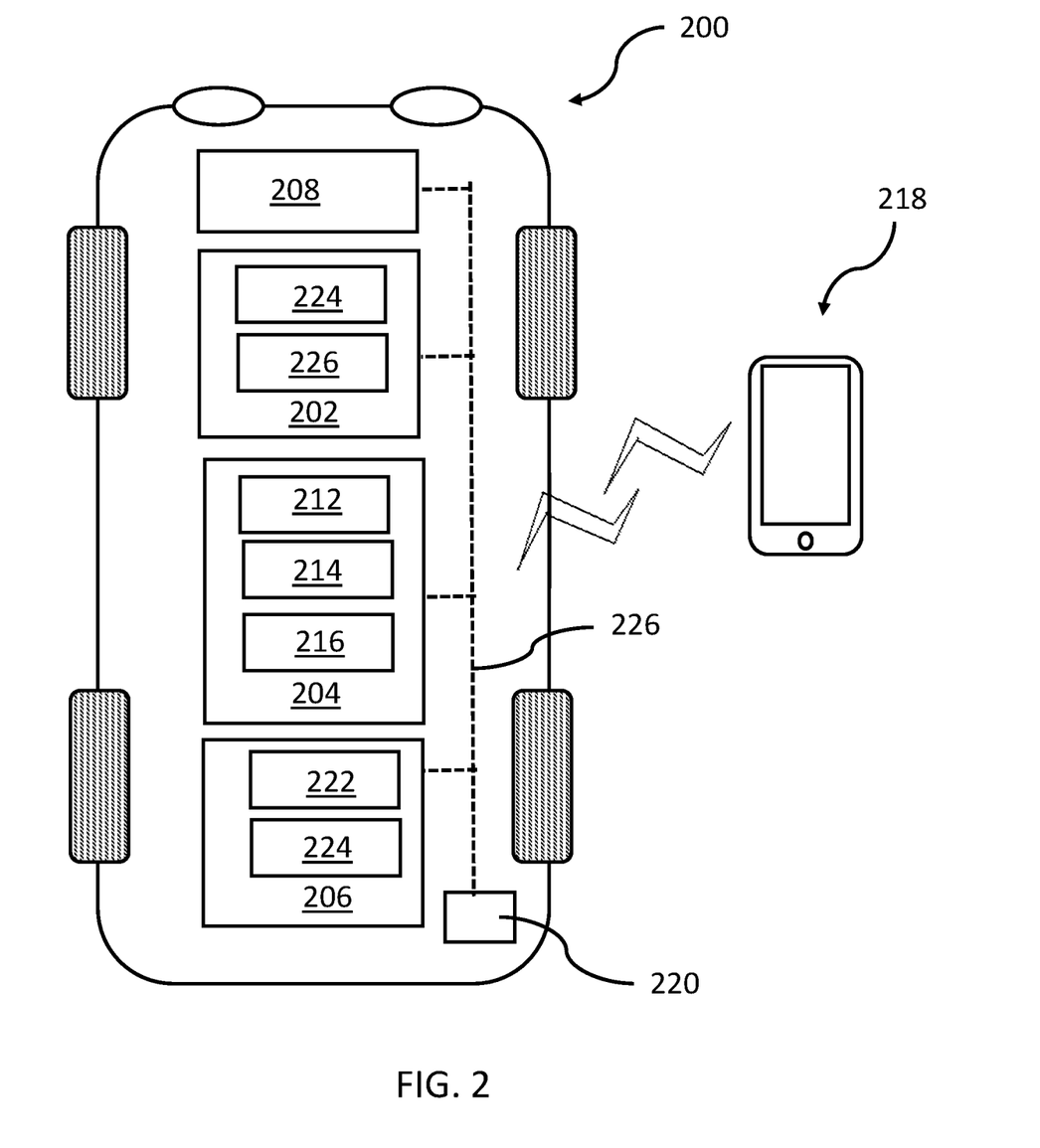
FIG. 2 is a functional diagram of an advance driver assisted system (ADAS) equipped vehicle having wireless communications and mobile-edge computing capabilities for data pooling, according to an exemplary embodiment.

FIG. 2 shows an ADAS equipped vehicle 200 in accordance with one aspect of the disclosure. The ADAS equipped vehicle 200 is configured to perform a level of driving automation from partial autonomous mode to full autonomous mode sufficient to participate in a platoon of vehicles. Driving automation can include a range of dynamic driving and vehicle operation including some level of automatic control or intervention related to simultaneous automatic control of multiple vehicle functions, such as steering, acceleration, and braking, with the driver having overall control of the vehicle. Driving automation can also include simultaneous automatic control of all vehicle driving functions, including steering, acceleration, and braking, wherein the driver cedes control of the vehicle for a period of time during a trip.

In the exemplary embodiment, the vehicle 200 includes an ADAS control module 202; a communications module 204 configured for V2V, D2D, and C-V2X communications; and a mobile edge module 206. As used herein, the term "module" may refer to, be part of, or include, but not limited to, an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. The term "code", as used above, may include software, firmware, and/or microcode, and may refer to programs, APPS, routines, functions, classes, data structures, and/or objects.

The ADAS control module 202 may include one or more processors 224, non-transitory memory 226 and other components typically present in computing devices. The non-transitory memory 226 stores information accessible by the one or more processors 224, including instructions and data that may be executed or otherwise used by the processor 224. The ADAS control module 202 is in communication with various vehicle control systems 208, such as deceleration system, acceleration system, steering system, signaling system, navigation system, positioning system, detection system, and other systems in order to control the movement, speed, etc. of the vehicle 200.

The communication module 204 may include a chipset 212 configured for Dedicated Short Range Communications (DSRC) protocol for Wi-Fi communication with other vehicles equipped with similar communication systems, to roadside units equipped with vehicle to everything (V2X) communications, and to UE devices. The communications module 204 may also include a wireless cellular chipset 214 for cellular communication (C-V2X) with a base station and for D2D communications, and a global positioning satellite (GPS) navigation unit 216. An antenna 220 may be provided on the vehicle 102 for servicing the DSRC chip set 212, wireless cellular chipset 214, and navigation unit 216.

The mobile edge module 206 may include one or more processors 222, non-transitory memory 224, and other components typically present in computing devices. The non-transitory memory 224 stores information and algorithms accessible by the one or more processors 222, including data and software applications that may be executed or otherwise used by the processor 222. The applications may be downloaded from a remote web-server by using C-V2X, downloaded from a vehicle 108, 110 participating in the platoon 100 100, or uploaded from a portable local memory device (not shown). The applications may include any software application that may process data off-loaded from an UE device and/or enhance the operations of the UE device or the ADAS.

While the ADAS control module 202, the communications module 204, and the mobile edge module 206 are shown as separate discrete modules, it should be appreciated that the components providing the functions of the modules 202, 204, 206 may be disposed within one single module or distributed amongst several modules located in varying locations within the vehicle 202 without departing from the scope of the invention.

Communication between one or more modules 202, 204, 206, 208, antenna 220, and various vehicle systems and sensors may be accomplished using a direct wired point-to-point link, a networked communication bus link, a wireless link or another suitable communication link 226. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

Figure 3:
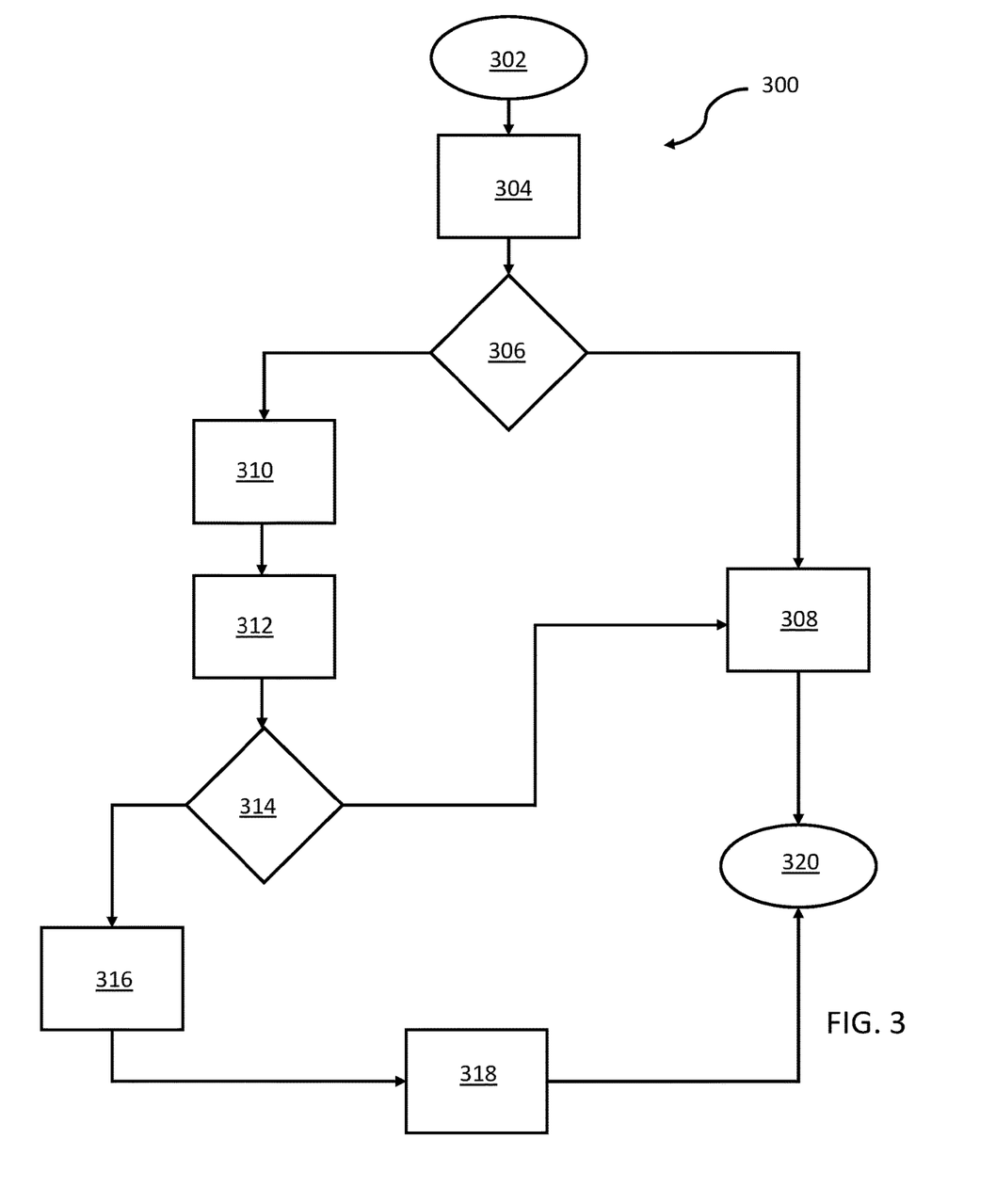
FIG. 3 is a block flowchart of a method of facilitating on-demand wireless connectivity and data pooling with a vehicle platoon.

FIG. 3 shows a block flow diagram of a method 300 for facilitating on-demand wireless connectivity and data pooling with a platoon of vehicles. The method 300 starts in block 302 when an ADAS equipped vehicle (requesting vehicle) is in need of on-demand mobile edge computing and desires to conserve its cellular data allowance by requesting to join a platoon 100. Moving to block 304, the requesting vehicle may utilize one or more of V2V communications, D2D communications, and C-V2X to search for a platoon of vehicles within a predetermined radius from the requesting vehicle. The predetermined radius may be expanded out to a few miles such as a 3 mile radius.

Moving to block 306, if a platoon of vehicles is not detected within the predetermined radius, then the method 300 moves to block 308 where the requesting vehicle continues searching within the predetermined radius and at a predetermined time interval, for example every 3 minutes, until a platoon of vehicles is found or the operator of the requesting vehicle discontinue the search, thereby ending at block 320.

Referring back to block 306, if a platoon of vehicles is detected within the predetermined radius, then the method 300 moves to block 310. In block 310, the requesting vehicle sends a request to the platoon of vehicles, preferably to the lead vehicle 108, along with the requesting vehicle's state-of-health of its ADAS system, communications systems, and other predetermined vehicle information necessary to join the platoon 100. The requesting vehicle also transmit a list of desired applications (APPS) to be utilized by the requesting vehicle.

Moving to block 312, the lead vehicle 108 of the platoon 100 verifies the platoon's wireless quality-of-service (QoS) and quality-of-experience (QoE) capabilities and availability of APPS desired by the requesting vehicle. Moving to block 314, if the platoon does not meet a predetermined on-demand QoS and QoE needs of the requesting vehicle, then the method 300 moves to block 308, where the requesting vehicle continues searching within the predetermined radius and at the predetermined time intervals until another platoon of vehicles is found or the operator ends the method at block 320.

Referring back to block 314, if the platoon is capable of meeting the on-demand QoS and QoE needs of the requesting vehicle, then the method 300 moves to block 316 where the lead vehicle sends a "join accepted" with platooning parameters and a join slot number to the requesting vehicle. The method then moves to block 318, where the requesting vehicle joins the platoon and the requesting vehicle's APP usage may be offloaded from the cellular network to the data-pipe 111 of the platoon using V2V or D2D communications for mobile edge computing, thereby moderating the resource consumption and processing load onto the cellular network.

Figure 4:
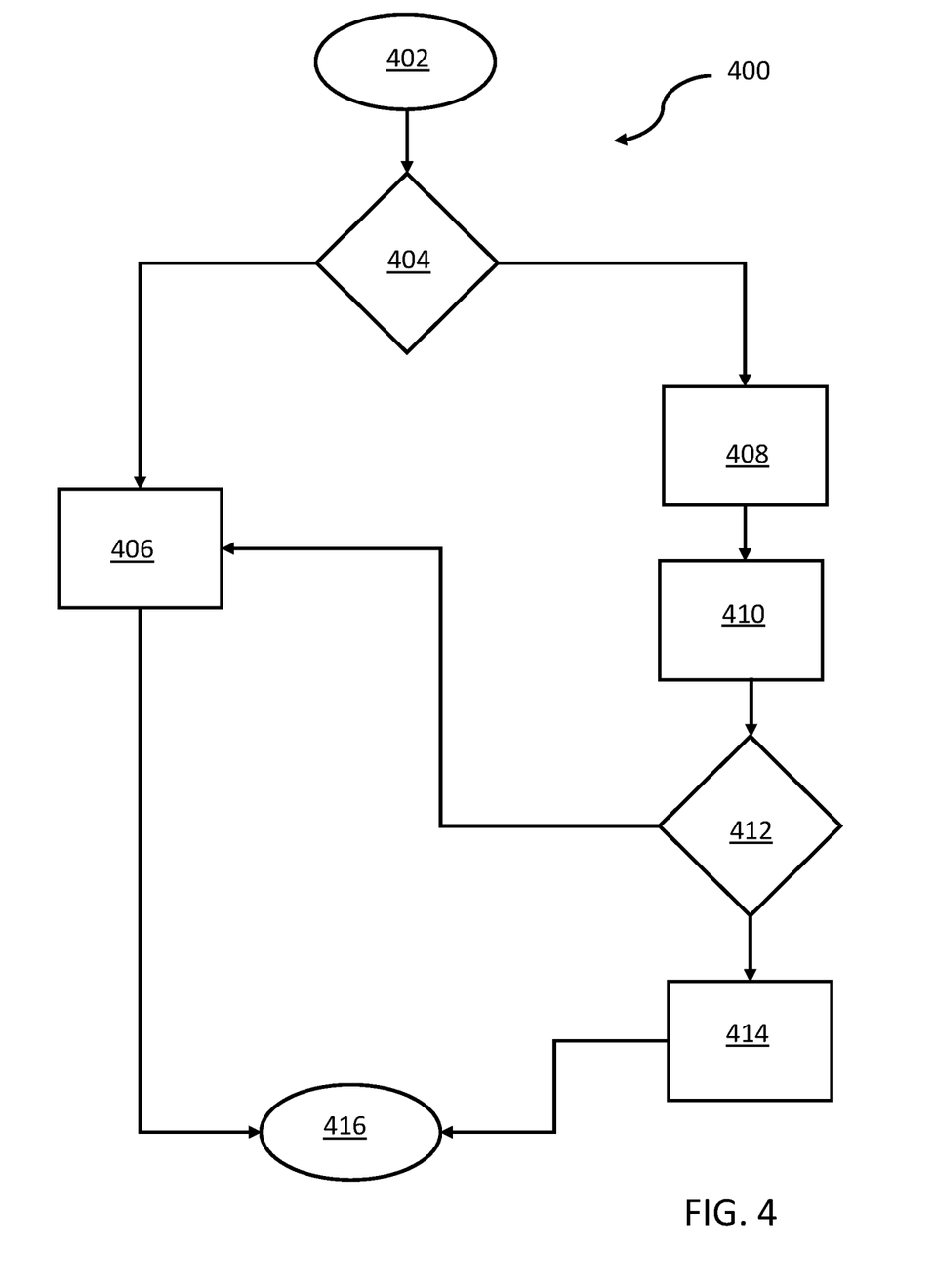
FIG. 4 is a block flowchart of a method of a requesting vehicle joining a data-pipe of the vehicle platoon prior to physically joining the platoon.

FIG. 4 provides a method 400 of a requesting vehicle joining the data-pipe 111 of the platoon of vehicles prior to physically joining the platoon. The method starts in block 402 when the requesting vehicle is in need of on-demand mobile edge computing to run an APP and desires to conserve its own cellular data allowance is connected to a remote platoon of vehicles using C-V2X communications, but is has not yet physically joined the platoon.

Moving to block 404, the requesting vehicle monitors the remote platoon of vehicles and determines if the platoon of vehicles is in range for one of V2V communications and D2D communications. If the platoon is not in range for D2D or V2V communications, then the method 400 moves to block 406 where the requesting vehicle continues to engage the platoon of vehicle using C-V2X. Referring back to block 404, if the platoon of vehicles is in range for D2D or V2V communications, then the method moves to block 408 where the requesting vehicle sends a request message to join platoon to the lead vehicle. The request message includes mandatory platooning parameters and application wireless radio/data needs.

Moving to block 410, the lead vehicle verifies required credential from the requesting vehicle. Moving to block 412, the lead vehicle determines if the requesting vehicle meets a predetermined minimal platooning and wireless requirements. If not, then the method moves to block 406 where the requesting vehicle continues to engage the platoon of vehicle using C-V2X. Otherwise, the method moves to block 414, where the requesting vehicle physically joins the platoon. Upon joining the platoon, the requesting vehicle's 200 APP usage may be offloaded from the cellular network to the data-pipe 111 of the platoon using V2V or D2D communications for mobile edge computing, thereby moderating the resource consumption and processing load onto the cellular network.

Figure 5:
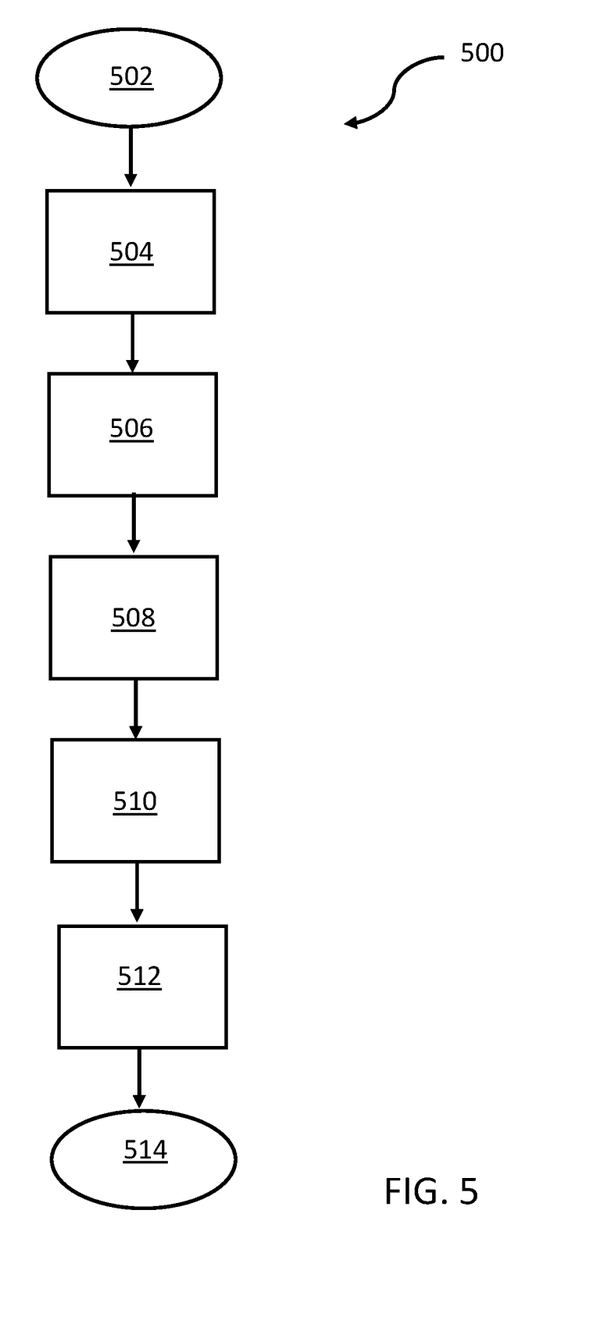
FIG. 5 is a block flowchart of a method of the requesting vehicle maintaining connection with the data-pipe of the vehicle platoon as the requesting vehicle leaves the platoon.

FIG. 5 provides a method 500 for the requesting vehicle maintaining connection with the data-pipe 111 of the platoon of vehicles as the requesting vehicle leaves the platoon. The method 500 starts at block 502 when the requesting vehicle has decided to physically leave the platoon.

Moving to block 504, the requesting vehicle sends a message to the lead vehicle informing the lead vehicle the decision of the requesting vehicle to leave or disengage from the platoon. Moving to block 506, the lead vehicle acknowledges the message to leave the platoon and sends instructions to the follow vehicles to prepare for the leaving of the requesting vehicle and to fill the space left behind after the requesting leaves the platoon.

Moving to block 508, the requesting vehicle sends a message to the lead vehicle informing the lead vehicle of the requesting vehicle's intention of continue application engagement with the platoon's data-pipe 111, even after physically leaving the platoon. Moving to block 510, the lead vehicle acknowledges the requesting vehicle's intention of continue application engagement with the platoon's data-pipe 111 even after the requesting vehicle leaves the platoon.

Moving to block 512, the requesting vehicle physically leaves the platoon and continues it engagement with the platoon by switching over from V2V or D2D communications to cellular data (C-V2X). The method ends in block 514.

Figure 6:
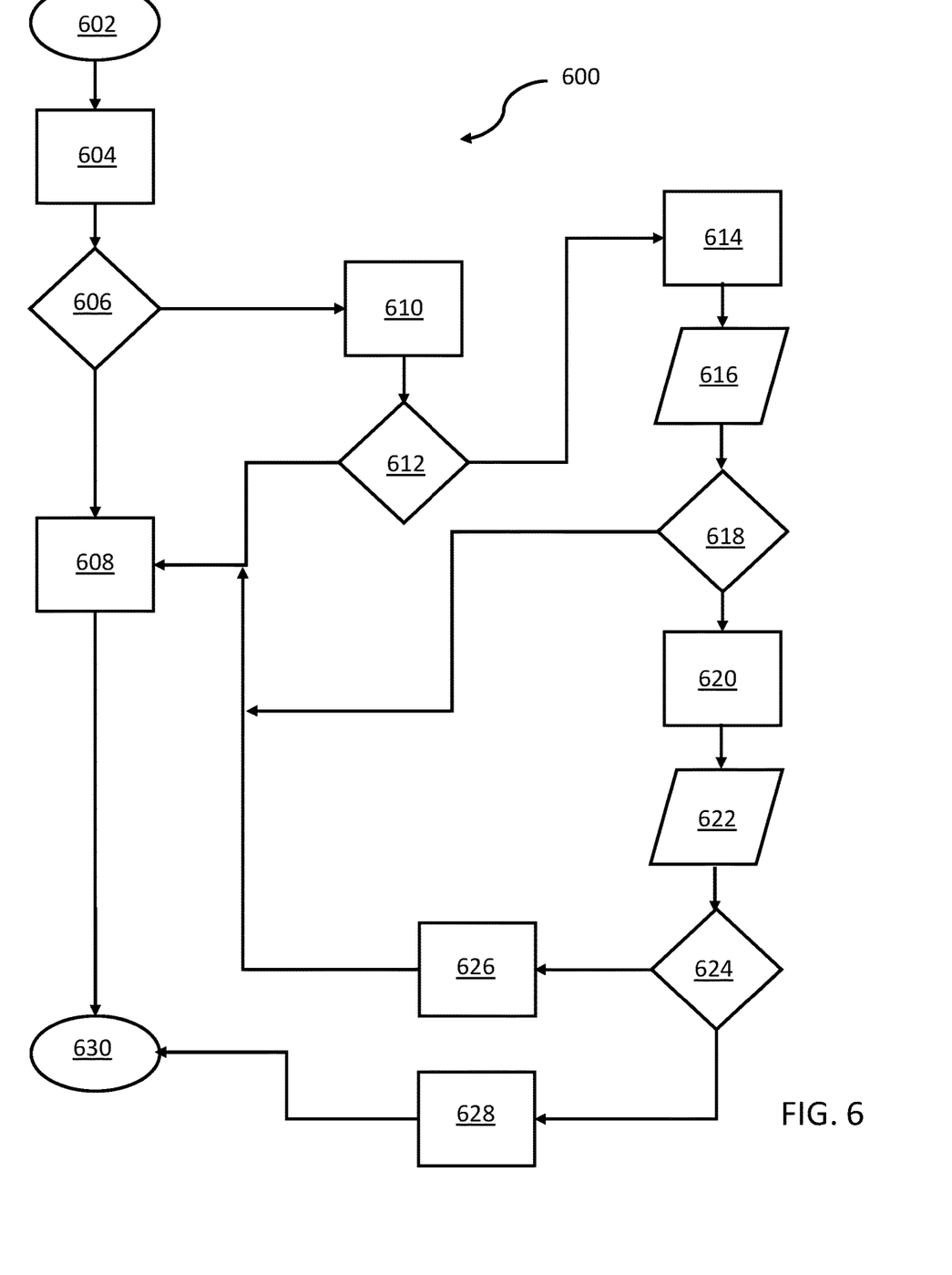
FIG. 6 is a block flowchart of a method of selecting a vehicle platoon that meets the on-demand wireless connectivity and data pooling needs of the requesting vehicle.

FIG. 6 shows a block flow diagram of an exemplary method 600 for facilitating on-demand wireless connectivity and data pooling by joining a platoon of vehicles having wireless communications and MEC capabilities. The method 600 starts in block 602 with a requesting vehicle is in need of on-demand mobile edge computing to meet the operating requirements of components of the ADAS, such as driver assist mode, safety video sharing, etc., and smart vehicle APPS.

Moving to block 604, the requesting vehicle searches within a 3 mile parameter and in 3 minute intervals for a potential host vehicle equipped with ADAS, wireless communications, and MEC capabilities. Wireless communications includes V2V, D2D, and C-V2X communications. MEC capabilities includes the ability to interface with MEC modules located proximal to road side units or base stations, or having an onboard MEC module.

Moving to block 606, if no potential host vehicle is available, then the method 600 proceeds to block 608 where the requesting vehicle continues searching for potential host vehicles within the predetermined radius and time interval. Referring back to block 606, if a potential host vehicle is detected, then the method 600 moves to block 610 where the requesting vehicle sends a request to join with the potential host vehicle.

Moving to block 612 from block 610, if the potential host vehicle is not interested, then the method 600 moves to block 608 where the requesting vehicle continues searching for potential host vehicles within the predetermined radius and time interval. Referring back to block 612, if the potential host vehicle is interested, the method 600 moves to block 614.

In block 614, the potential host vehicle requests the requesting vehicle's platooning capabilities. Moving to block 616, in response, the requesting vehicle sends is platooning capabilities to the potential host vehicle. Moving to block 618, the potential host vehicle determines whether the requesting vehicle meets a predetermined standard to participate in a platoon. If the requesting vehicle does not meet the predetermined standard to participate in a platoon, then the method 600 moves to block 608 where the requesting vehicle is rejected from joining the potential host vehicle and continues searching for other potential host vehicles within the predetermined radius and time intervals. If the requesting vehicle meets the predetermined standard to participate in a platoon then the method moves to block 620.

In block 620, the requesting vehicle request the potential host vehicle's wireless QoS/QoE metrics for ADAS APPS and smart vehicle APPS. Moving to block 622, the potential host vehicle's wireless QoS/QoE metrics is received by the requesting vehicle. Moving to block 624, the requesting vehicle determines if the potential host vehicle's wireless QoS/QoE metrics meets a predetermined minimal requirements for operating ADAS and smart vehicle APPS. For example, the minimal requirements may be 5G QoS for assisted vehicle video buffering, a guaranteed bit rate (BR) with packet budget rate of 75 ms and packet error rate (PER) of 10-2. In case of V2X messages for platooning the PER is 10-2 and BR is 50 ms.

From Block 624, if the minimal requirement is not satisfied, then the method moves to block 626 where the requesting vehicle sends a wireless QoS/QoE rejection to the potential host vehicle and returns to block 608. If the minimal requirement is satisfied, then the method moves to block 628 where the requesting vehicle joins the platoon. The method ends in block 630.

Figure 7:
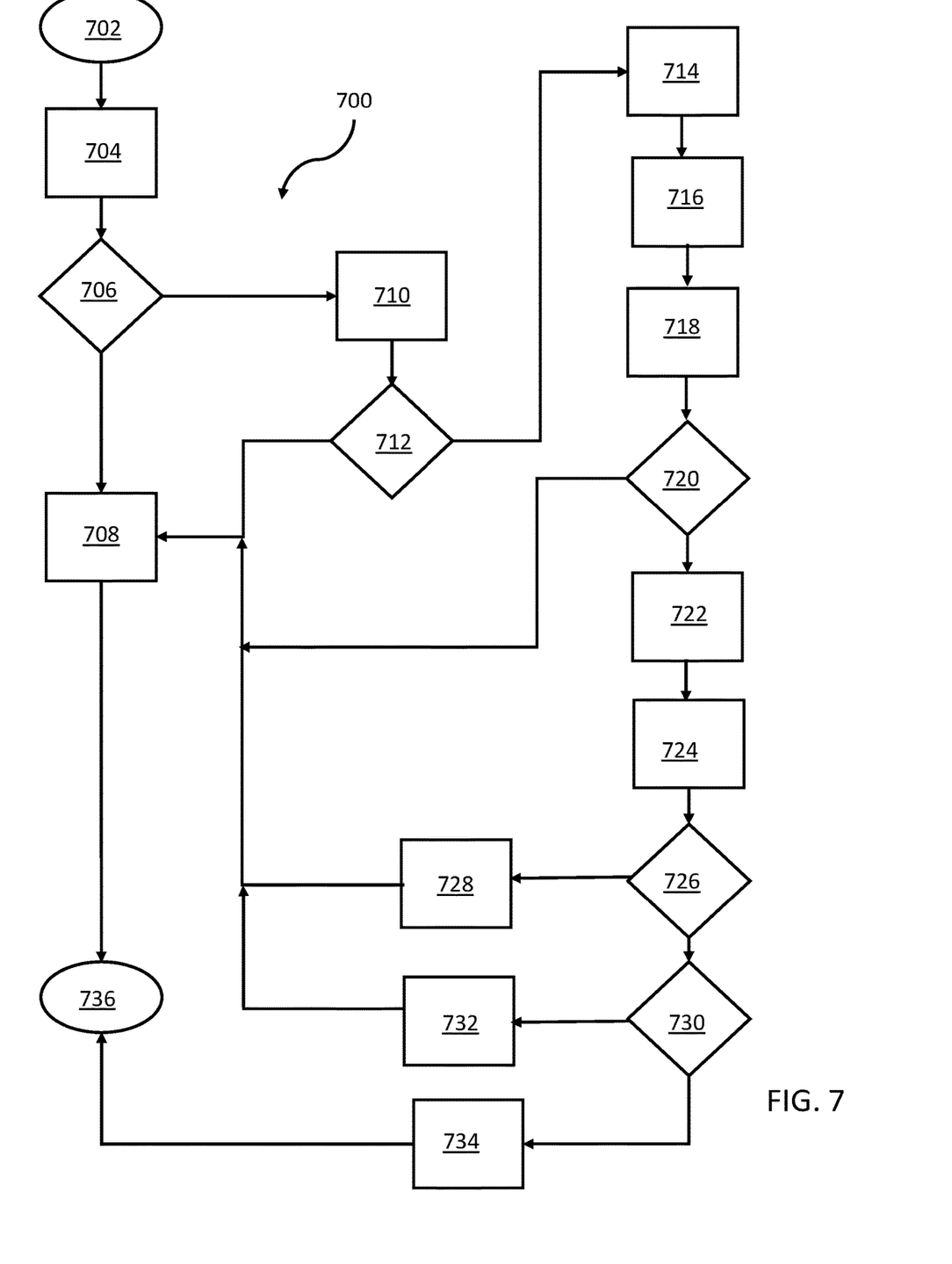
FIG. 7 is a block flowchart of a method of forming a vehicle platoon that meets the on-demand wireless connectivity and data pooling needs of a gaming application of the requesting vehicle.

FIG. 7 shows a block flow diagram of an exemplary method 700 for facilitating on-demand wireless connectivity and data pooling by forming a platoon of vehicles to meet the required operating parameters for online gaming. The method starts in block 702.

Moving to block 704, the requesting vehicle searches within a 3 mile parameter and in 3 minute intervals for a potential host vehicle equipped with ADAS, wireless communications, and gaming capabilities.

Gaming capabilities includes applicable gaming applications (Game APPS) and the ability to interface with MEC modules proximal to road side units or base stations or having an onboard MEC module for the processing of the Game APPS. The requesting vehicle broadcasts its intention to create a platoon and to run a host of predetermined Game APPS.

Moving to block 706, if no potential host vehicle is available, the method 700 proceeds to block 708 where the requesting vehicle continues searching for potential host vehicles within the predetermined radius and time interval. Referring back to block 706, if a potential host vehicle having gaming capabilities is available, the method 700 moves to block 710 where the requesting vehicle sends a request to the potential host vehicle to form a platoon.

Moving to block 712 from block 710, if the potential host vehicle is not interested, then the method 700 moves to block 708 where the requesting vehicle continues searching for potential host vehicles within the predetermined radius and time interval. Referring back to block 712, if the potential host vehicle is interested, the method 700 moves to block 714.

In block 714, the requesting vehicle requests the potential vehicle capabilities. Moving to block 716, in response, the potential host vehicle sends the potential vehicle's platooning capabilities. Moving to block 718 the requesting vehicle determines whether the potential host vehicle's platooning capabilities meets a predetermined minimal standard. Moving to block 720, if no potential host vehicle meets the predetermined minimal standard then the method moves to block 708, where the requesting vehicle continues searching for potential vehicles within the predetermined radius and time intervals. If the potential host vehicle meets the predetermined minimal capabilities for platooning then the method moves to block 722.

In block 722, the requesting vehicle request the potential host vehicle's wireless QoS/QoE metrics for Game APPS and a preference list of Game APPS. Moving to block 724, the potential host vehicle's wireless QoS/QoE metrics is received by the requesting vehicle. Moving to block 726, the requesting vehicle determines if the potential host vehicle meets all the gaming capabilities. If the minimal requirement is not satisfied, then the method moves to block 728 where the requesting vehicle sends a gaming preference rejection to the potential host vehicle.

Referring back to block 726, if the minimal requirement is satisfied, then the method moves to block 730 where the requesting vehicle determines if the wireless QoS/QoE for elected gaming is equal to or greater than the minimal requirement. For example, the minimal requirements may be 5G QoS for assisted vehicle video buffering, a GBR with packet budget rate of 75 ms and PER of 10-2, and in case of V2X messages for platooning PER is 10-2 and BR is 50 ms.

From block 730, if the wireless QoS/QoE for selected Game APP is not equal to or greater than the minimal requirement for gaming then the method moves to block 732 where the requesting vehicle sends a wireless QoS/QoE reject to the potential host vehicle. If the minimal requirement is equal to or greater than the minimal requirement for gaming, then the method moves to block 734 where the requesting vehicle sends a confirmation to the potential-host vehicle join with the requesting vehicle. The method ends in block 736.

The disclosure above are exemplary methods to facilitate on demand wireless connectivity using V2V/D2D radio resources and data pooling with a vehicle platooning system. A vehicle demanding higher quality of experience can be better achieve by joining a vehicle platoon to share radio and data resources for mobile edge computing needs and time sensitive data applications. The exemplary methods provide uninterrupted data-pipe for assisted vehicle and smart vehicle applications, reduced packet error rate, reduced forward error coding insufficiencies, reduced data-pipe cost, and reduced latency.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method of facilitating on-demand wireless connectivity and data pooling with a vehicle platoon, comprising:
   detecting the vehicle platoon within a predetermined radius, wherein the vehicle platoon comprises a plurality of participating vehicles configured for wireless communications and for the data pooling between the plurality of participating vehicles;
   sending a request message to the vehicle platoon, wherein the request message includes a request to join the vehicle platoon;
   receiving a reply message from the vehicle platoon, wherein the reply message includes a permission to join the vehicle platoon;
   joining the vehicle platoon;
   using device-to-device (D2D) communications to communicate with the plurality of participating vehicles in the vehicle platoon;
   wherein the request message includes a list of software applications, and wherein the reply message includes confirmation that at least one of the plurality of participating vehicles is configured to execute at least one software application (APP) on the list of software applications; and further comprises:
   using the D2D communications to data pool application data (APP data) with the vehicle platoon for execution the at least one APP;
   sending an intent to leave message to the vehicle platoon, wherein the intent to leave message includes an intent to remain in communication with the vehicle platoon for continued execution of the at least one APP;
   leaving the vehicle platoon; and
   switching from one of a vehicle-to-vehicle (V2V) communications and the D2D communications to a cellular-to-vehicle (C-V2X) communications to remain in communication with the vehicle platoon for continued execution of the at least one APP after leaving platoon.

2. The method of claim 1, wherein the vehicle platoon includes a mobile edge computing (MEC) capability, and further comprising executing the at least one APP using the MEC capability.

3. The method of claim 2, wherein the MEC capability includes a MEC module disposed on-board one of the plurality of participating vehicles.

4. The method of claim 1, wherein the reply message from the vehicle platoon includes a confirmation that the vehicle platoon has at least one APP on the list of software applications available for downloading using the D2D communications.

5. The method of claim 1, where the reply message from the vehicle platoon includes a verification that the vehicle platoon is capable of providing a predetermined level of quality-of-service and quality-of-experience for executing the at least one APP.

6. The method of claim 1, further comprising using the cellular-to-vehicle (C-V2X) communications to communicate with the vehicle platoon for executing the at least one APP before joining the vehicle platoon.

7. The method of claim 6, further comprising switching to one of the V2V communications and the D2D communications to communicate with the vehicle platoon for executing the at least one APP after joining the vehicle platoon.

8. The method of claim 1, wherein the at least one APP is one of an advance driver assisted system application and a gaming application.

9. A method of facilitating on-demand wireless connectivity between vehicles, comprising:
   detecting, by a requesting vehicle, a potential host vehicle within a predetermined radius from the requesting vehicle, wherein the potential host vehicle is configured with an advance driver assisted system (ADAS), wireless communications, and mobile edge computing (MEC) capabilities;
   sending a request message, by the requesting vehicle, to the potential host vehicle requesting to join the potential host vehicle in a vehicle platoon and to execute an application (APP) by utilizing the potential host vehicle's MEC capabilities;

sending a reply message, by potential host vehicle, to join the potential host vehicle in the vehicle platoon;

joining the potential host vehicle, by the requesting vehicle, in the vehicle platoon;

wirelessly transmitting APP data, by the request vehicle, to the potential host vehicle in the utilization of the host vehicle's MEC capabilities;

sending, by the requesting vehicle, an intent to leave message to the vehicle platoon, wherein the intent to leave message includes an intent to remain in communication with the vehicle platoon for continued execution of the at least one APP; and leaving, by the requesting vehicle, the vehicle platoon.

10. The method of claim 9, wherein wirelessly transmitting information to the potential host vehicle includes using a Device-to-Device (D2D) communications.

11. The method of claim 10, wherein the vehicle platoon includes a plurality of participating vehicles using the D2D communications to transmit a data-pool defining a data-pipe amongst the plurality of participating vehicles.

12. The method of claim 11, wherein the APP includes an APP to operate a component of the ADAS; and further include the requesting and evaluating the platooning capabilities of the requesting vehicle, by the potential host vehicle, before sending the reply message to join the potential host vehicle in the vehicle platoon.

13. The method of claim 9, wherein the potential host vehicle includes an onboard MEC module operable to provide MEC capabilities.

14. A method of facilitating on-demand wireless connectivity with a vehicle platoon, comprising:

detecting, by a requesting vehicle, the vehicle platoon within a predetermined radius, wherein the vehicle platoon comprises a plurality of participating vehicles configured to wirelessly exchange information with each other;

sending, by the requesting vehicle, a request message to the vehicle platoon, wherein the request message includes a request to join the vehicle platoon;

receiving, by the requesting vehicle, a reply message from the vehicle platoon, wherein the reply message includes a permission to join the platoon;

joining, by the requesting vehicle, the vehicle platoon;

using, by the requesting vehicle, one of a device-to-device (D2D) communications and a vehicle-to-vehicle (V2V) communications to exchange APP data with the vehicle platoon for executing at least one APP after joining the vehicle platoon;

executing, by the vehicle platoon, the at least one APP using mobile edge computing;

using, by the requesting vehicle, a cellular-to-vehicle (C-V2X) communication to exchange information with the vehicle platoon for executing the at least one APP before joining the vehicle platoon;

sending, by the requesting vehicle, an intent to leave message to the vehicle platoon, wherein the intent to leave message includes an intent to remain in communication with the vehicle platoon for continued execution of the at least one APP; and leaving, by the requesting vehicle, the vehicle platoon.

15. The method of claim 14, further comprising switching, by the requesting vehicle, from one of the V2V communication and the D2D communication to the C-V2X communication to remain in communication with the vehicle platoon for continued execution of the at least one APP after the leaving the vehicle platoon.

16. The method of claim 15, wherein the potential host vehicle includes an onboard MEC module operable to provide MEC capabilities.

* * * * *